United States Patent [19]

Gleim et al.

[11] Patent Number: 5,237,246

[45] Date of Patent: Aug. 17, 1993

[54] PROCESS AND DEVICE FOR ADJUSTING PICTURES

[75] Inventors: Günter Gleim, VS-Villingen; Friedrich Heizmann, VS-Obereschach; Jaques Chauvin, Mönchweiler, all of Fed. Rep. of Germany

[73] Assignee: Deutsche Thomson-Brandt GmbH, Villingen-Schwenningen, Fed. Rep. of Germany

[21] Appl. No.: 889,713

[22] Filed: May 28, 1992

Related U.S. Application Data

[63] Continuation of PCT/EP90/01831 Nov. 2, 1990.

[30] Foreign Application Priority Data

Nov. 4, 1989 [DE] Fed. Rep. of Germany ....... 3936789

[51] Int. Cl.[5] ......................... H01J 29/70; H01J 29/76
[52] U.S. Cl. ..................................... 315/403; 315/10; 358/69; 358/60
[58] Field of Search ..................... 315/10, 403; 358/60, 358/69, 237, 180

[56] References Cited

U.S. PATENT DOCUMENTS

| 3,895,252 | 7/1975 | Funakawa et al. | 315/136 |
| 4,085,425 | 4/1978 | Hamill | 358/237 |
| 4,104,567 | 8/1978 | Peer et al. | 315/387 |
| 4,395,662 | 7/1983 | Sexton, Jr. | 358/60 |
| 4,590,408 | 5/1986 | Mays | 315/403 |
| 4,593,308 | 6/1986 | Kemplin | 358/10 |
| 4,812,713 | 5/1989 | Blanchard | 315/370 |
| 4,833,371 | 5/1989 | Boon et al. | 315/403 |
| 4,896,082 | 1/1990 | Geiger | 358/69 |
| 5,010,280 | 4/1991 | Ogino et al. | 315/403 |

FOREIGN PATENT DOCUMENTS

3311971 10/1984 Fed. Rep. of Germany.

OTHER PUBLICATIONS

Patent Abstracts of Japan 61-280171.
Patent Abstracts of Japan 63-67887.

Primary Examiner—Theodore M. Blum
Attorney, Agent, or Firm—Joseph S. Tripoli; Joseph J. Laks; Daniel E. Sragow

[57] ABSTRACT

A system for adjusting the position and size of a picture generated by deflecting a light source in response to a deflection current and displayed in a picture area larger than the picture includes sensors for sensing the picture arranged outside the picture and within the picture area. First and second differential amplifier both have an inverting and noninverting input terminal. A deflection voltage proportional to the deflection current is applied to the noninverting input terminal of the first differential amplifier and to inverting input terminal of the second differential amplifier. A first reference voltage is applied to the inverting input terminal of the first differential amplifier to produce a positive correction pulse in accordance with the difference between the deflection voltage and the first reference voltage. A second reference voltage is applied to the noninverting input terminal of the second differential amplifier to produce a negative correction pulse in accordance with the difference between the deflection voltage and the second reference voltage. A correction signal generator is responsive to the correction pulses and provides correction signals to the deflection circuit.

6 Claims, 2 Drawing Sheets

PROCESS AND DEVICE FOR ADJUSTING PICTURES

This is a continuation of PCT application PCT/EP 90/01831 filed Nov. 2, 1990 by Gunter Gleim, Friedrich Heizmann and Jacques Chauvin and titled "Process And Device For Adjusting Pictures".

The invention is directed to a process and method for adjusting a picture. The term picture adjustment as used herein is understood to be the stabilization of size and position of an image to be presented.

The inventive system and method are used in conjunction with a television device. The term television device as used herein is understood to be any electronic display device used to reproduce images and in which the image to be displayed is produced using deflection values. The image produced by the television display device can be received as a television broadcast signal, or as a pure monitor signal fed by an RGB signal, a CVBS signal or separately with the luminance signal and the color subcarrier, or the signal received from a video disc player or a VCR.

The display unit can be, for example, a kinescope (cathode ray tube—CRT) of a common television device or, several cathode ray tubes which cooperate to form a projection television device. In display devices using CRT's, deflection currents for the horizontal and vertical deflection of the corresponding electron beams establish the deflection values. Further, it is also conceivable that the display unit is a laser beam system, whereby the laser beam deflection, for example, is carried out by reflecting or refractive means which are controlled according to the required deflection. Such laser beam systems are preferably used for projection television devices. Television devices of these types are used to generate a complete picture on a display surface, such as a CRT faceplate or a projection screen.

When the complete picture is generated by a single kinescope, an undesired change in the picture height, width or position leads to impairment for the viewer. This can occur if the television device serves as a monitor and is connected to different image sources such as computers, for example. However, impairments are especially disturbing when the complete picture is generated from individual images formed by several individual display units, the height, width or position of which are undesirably altered for one reason or another. The individual images can be monochromatic images of the primary colors red (R), green (G), blue (B) projected onto a single screen to produce a full a color picture. Alternatively, it is also possible to display partial images which are adjacent to each other and thus displayed on neighboring areas of the screen. Other appropriate combinations can also be used to produce pictures using the inventive concepts. Corresponding considerations are also valid for the laser beam systems.

With projection television devices, three monochromatic images in the primary colors R, G, B are projected from three separate kinescopes onto a picture area considerably larger than the screen of the kinescope. The three monochrome images are superimposed on the screen to produce a color picture. The individual images generated on the screens of the kinescopes are greatly enlarged when they are projected onto the screen. Inaccuracies in the projected picture can occur because of the enlargement and projection and through other alterations in the circuits and projection equipment. These inaccuracies consist primarily of an undesired displacement of the image within the picture area in either the horizontal or the vertical direction, or as an unwanted alteration to the amplitude of the horizontal deflection or the vertical deflection.

The regulation of the size and position of individual images which produce a complete picture using photosensors is already known. Thus, for example, a system for regulating the size and position of television pictures is described in U.S. Pat. No. 4,085,425. In this system the individual images, which produce a complete picture, are detected by means of photosensors and correspondingly corrected by suitable correction means. The use of photosensors presented in the U.S. patent specification cited has, in particular with a projection television device, the disadvantage that suitable connection lines must be provided between the sensors and a suitable electronic device.

It is an object of the invention to provide a simple and effective stabilization of the image displayed on the picture screen. The invention is based on the knowledge that deviations from the desired beam deflection are caused primarily by electronic components, and that, compared to the electronic deviations, negative influences caused by the corresponding beam optics are small. That is, the relationship between a corresponding deflection value and the actual deflection in practice is not subject to any considerable fluctuation. According to the invention, the deflection values for the horizontal and/or vertical deflection are detected within a time period for which their corresponding desired value is known. By comparing the desired and the actual values, corrections are performed so that the deviations in the horizontal and/or vertical direction do not exceed predetermined values.

Photosensors are precisely arranged at known positions on the screen and a line of the deflection screen is marked with a marker pulse using a light sensor which is precisely located at a particular point on the screen. The image on the screen thus remains stable. In this manner a tagged line of a video signal always lies at the same spatial point on the picture area and all influences on amplitude and position of the deflection in the horizontal and vertical directions caused by influences, such as for example temperature and aging, are compensated for.

With a projection television display device in which the displayed image is projected onto a distant picture area, the light sensors can be disposed in the vicinity of the picture area. Then, because of the rather large distance between the screen and the projection device, even small deviations produce usable light sensor signals, according to the law of beams. With one embodiment of the inventive system, the light sensors are disposed in the vicinity of the projection television device, thereby requiring shorter connecting lines in comparison to an arrangement in which the light sensors are located near the picture area.

Before the embodiment example is more closely described, it should be pointed out that the blocks illustrated individually in the figures serve merely for a better understanding of the invention. Normally, single or several blocks are combined to form units. These can be realized in integrated or hybrid technology or as program-controlled microcomputer or, respectively, as a part of a program suited to the control of a microprocessor.

Figure 1:
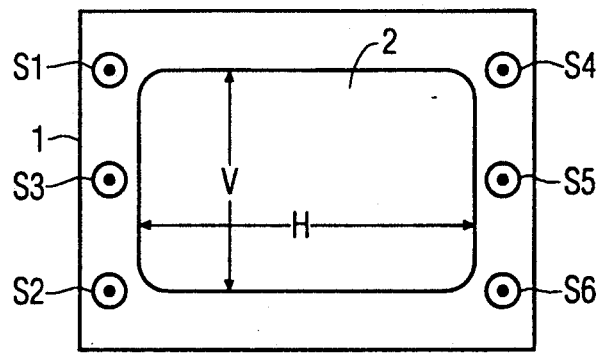
FIG. 1 shows the principles of the presentation of an image on a picture area.

In FIG. 1, a picture 2, with vertical deflection amplitude or picture height V and horizontal deflection amplitude or picture width H, is projected onto the picture area 1. Light sensors S1 through S6 are located outside the picture 2 but within the picture area 1 their function is explained in more detail below.

Figure 2:
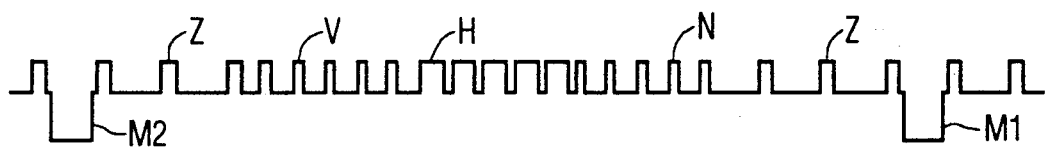
FIG. 2 is a pulse diagram for a marker pulse.

FIG. 2 shows a video signal which is privided to a television device which is to be controlled. The video signal includes two marker pulses M1 and M2 which are always impressed onto the signal during one line within the vertical blanking period. These marker pulses M1, M2 cause predetermined values of a deflection current (ia) which controls the deflection of the kinescopes being used to produce the picture.

Figure 3:
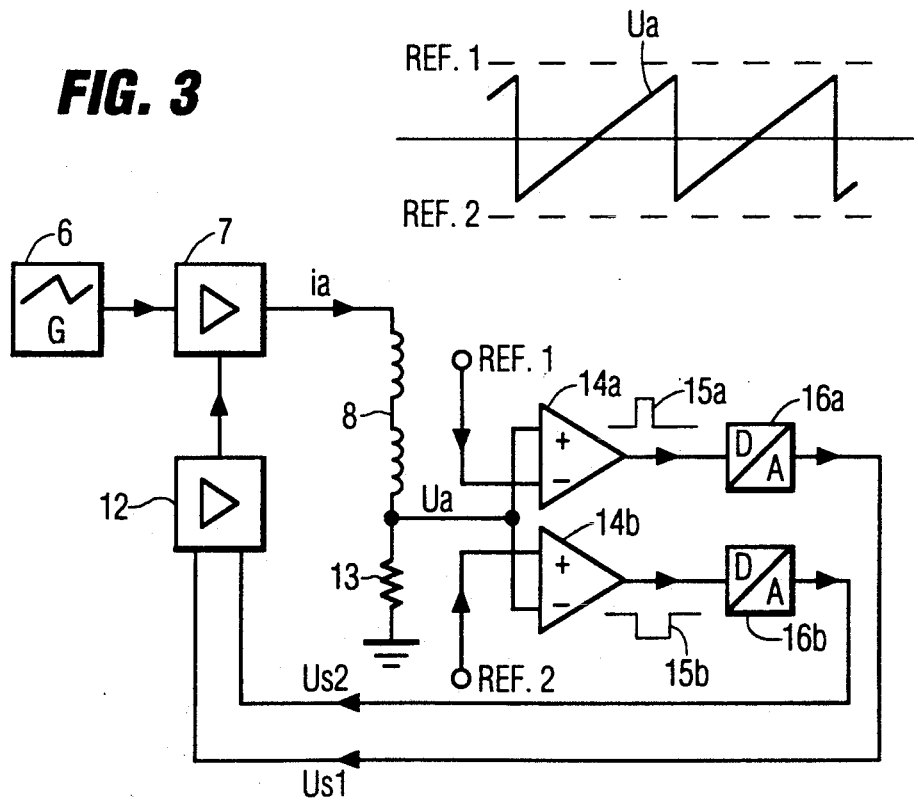
FIG. 3 is a preferred embodiment of a circuit for regulating the amplitude of the deflection current.

A preferred embodiment of the device according to the invention is illustrated in FIG. 3. A vertical deflection generator 6 provides the deflection current ia, via an amplifier 7, to the vertical deflection coils 8 which are associated with a kinescope, which is not illustrated. Three such kinescopes are normally provided in a projection television device and the monochromatic images in the primary colors red, green, blue from the three kinescopes are projected onto and superimposed on the picture area 1, see FIG. 1.

A resistor 13 is connected via its first terminal to the vertical deflection coils 8 and the second terminal of the resistor is connected to a reference potential, such as ground. A voltage Ua, which is generated by and is proportional to the deflection current ia, is available at the junction of the coils 8 and the resistor 13, and is applied to the differential amplifiers 14a and 14b. The differential amplifiers 14a and 14b respectively compare voltage Ua to reference voltages Ref. 1 and Ref. 2. The differential amplifiers 14a and 14b supply pulse-shaped difference signals 15a and 15b in accordance with the deviations from the reference values. The difference signals are converted into analog signals in two digital-to-analog converters 16a and 16b respectively. The analog and permanently available correction variables Us1 and Us2 available at the output of digital-to-analog converters 16a and 16b influence, via a driver circuit 12, the deflection amplifier 7. The correction variable Us1 stabilizes the positive values of the deflection current ia, i.e. the vertical amplitude towards the upper picture edge, and correction variable Us2 stabilizes the negative values of ia, i.e. the deflection amplitude towards the lower picture edge.

The circuit shown in FIG. 3 can be used practically unchanged for the stabilization of the horizontal deflection amplitude in that the line deflection current is fed via resistor 13 and the correction variables produced influence the line output transformer to regulate the amplitude of the line deflection current.

Figure 4:
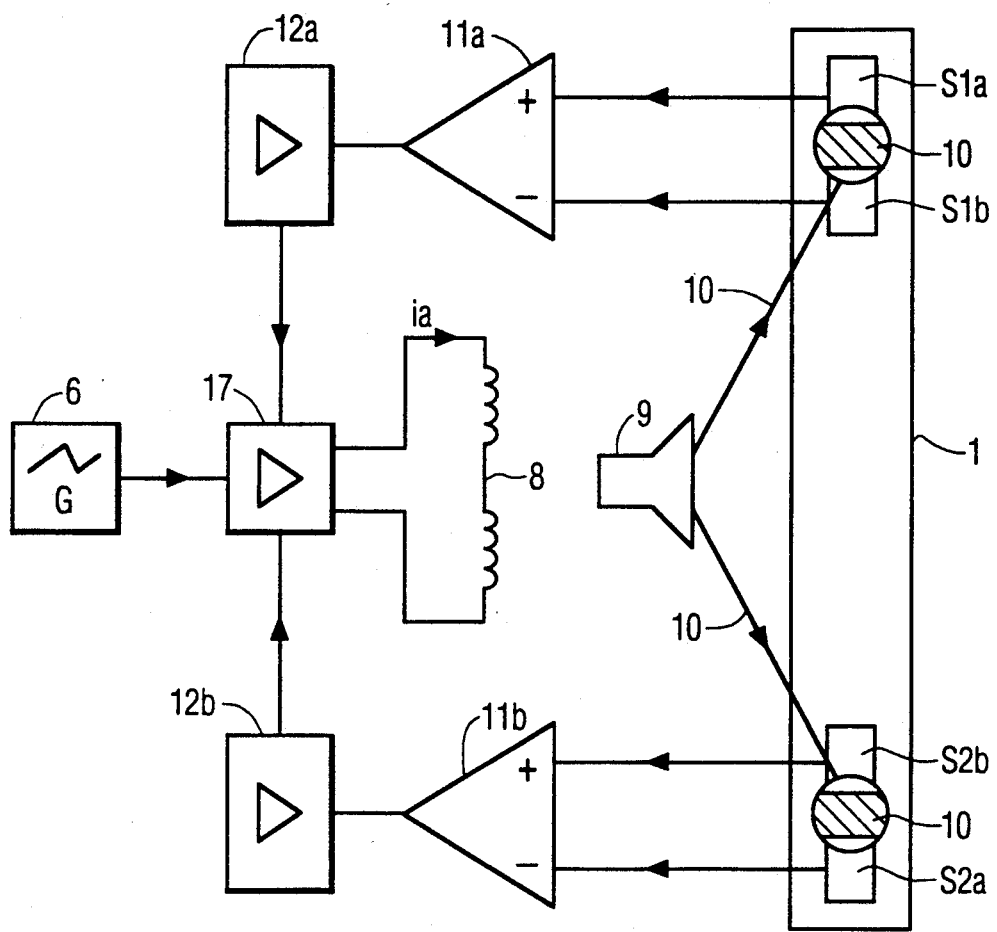
FIG. 4 is a second preferred embodiment including stabilization light sensors.

FIG. 4 shows a preferred embodiment which additionally regulates the size and the position of the picture 2 to be presented by means of the sensors S1 through S6 illustrated in FIG. 1.

The vertical deflection generator 6 actuates a gain control amplifier 17, which in addition to the amplifier 7 shown in FIG. 3, also contains the elements 13 through 16 of the FIG. 3 embodiment The vertical deflection coils 8 are associated with a kinescope 9 to generate, in conjunction with other kinescopes not illustrated here, a complete picture 2 within the picture area 1.

The sensors S1 through S6 shown in FIG. 1 preferably are disposed outside the picture 2, but within the picture area 1 and are illuminated by the light beam provided by the kinescope 9. The video signal deflecting the light from the kinescope contains marker pulses M1 and M2 which occur at certain spaced times. The deflection amplitude is regulated to adjust the marker pulses to the sensors S. Accordingly, sensors S1 and S2 or S4 and S6 can be used to adjust and stabilize the vertical deflection amplitude using the marker pulses. Likewise, sensors S1 and S4 or S3 and S5 or S2 and S6 can be used to adjust and stabilize the horizontal deflection amplitude H.

A total of six sensors is not necessarily required. In some instances it may be adequate to have only the sensors S1, S2, S4 and S6 arranged in the area of the corners of picture 2, or only the sensors S1, S2, S3 arranged on one side of the picture 2 may be adequate.

The picture area 1 contains the sensors S1, S2 shown in FIG. 1 which, as shown in FIG. 4, are both subdivided into two sensor fields S1a, S1b and S2a, S2b. In the desired position, a light beam 10, generated by kinescope 9 in response to a corresponding marker pulse which is impressed upon the video signal, strikes exactly in the middle between two sensor fields S1a, S1b or S2a, S2b. The output voltages of the sensor fields are provided to two differential amplifiers 11a and 11b which, via driver stage 12a and 12b, influence the gain control amplifier 17 to effect the desired vertical deflection. When the deflection amplitude is too large, the beam 10 strikes more on the sensor fields S1a and S2a, and less on sensor fields S1b and S2b. The deviation from the desired position is registered in the differential amplifiers 11a and 11b. The output signals of the differential amplifiers 11a and 11b regulate the deflection current ia to cause the beam 10 to be deflected to the proper positions with respect to the sensors S1a, S1b and S2a, S2b.

The gain control amplifier 17 also contains suitable and means, which are known as such, detect the value of the regulating current during the desired position and correct, or rather adapt the reference values Ref. 1 and Ref. 2 accordingly. It should be pointed out here that marker pulses M1 and M2, whose corresponding values for the deflection current ia are compared with the reference values Ref. 1 or Ref. 2 respectively, are not necessarily identical with the marker pulses which generate the light beam 10. However, it is possible to convert the appropriate deflection current values.

In FIGS. 3 and 4, the correction voltages are obtained for only a short time, namely, when the deflection current reaches its maximum positive or negative value respectively, or if the light beam 10 strikes one of the sensors S.

As the correction itself must be permanently effective, it is necessary to convert the respective correction voltage only briefly obtained into a correction voltage which is permanently present. This can be carried out using a low pass filter or a holding circuit in which the respective correction voltage obtained is maintained using a capacitor. A digital circuit can be used for this in an advantageous way, for example, a microprocessor, a digital-to-analog converter, or similar circuit. In FIG. 3, the digital-to-analog converters 16a, 16b serve the purpose of converting the briefly appearing signals 15a and 15b into permanently available analog signals. Signals 15a and 15b serve in this case as a digital signal with one bit which generates a corresponding analog signal at the output of converters 16a and 16b. The ability of such converters to maintain an analog output signal generated from a binary signal for any length of time is advantageously exploited for the conversion of the pulse-shaped correction voltage into an analog correction voltage which is permanently available. Such a circuit with digital-to-analog converters or equally capable digital components can also be applied in FIG. 4 in order to generate the briefly created correction voltage at the output of the sensors into the required permanently available analog correction voltage for controlling amplifier 17.

In FIGS. 3 and 4 therefore, the upper half of the picture and the lower half of the picture are always stabilized separately from each other, whereby the zero line, i.e. the horizontal line in the center, is not affected. Through separate stabilization of the deflection amplitude in the positive and negative direction, a combination of an alteration to the total deflection amplitude with an alteration in the position of the picture can arise in the general case. The same relationships are also valid for stabilizing the horizontal deflection amplitude H.

The regulation of the deflection amplitude described can also be applied to different operating modes with various deflection amplitudes, for example, if the vertical deflection amplitude exceeds the height of the picture shown in FIG. 1 in the sense of an overwriting. The deflection amplitude may be changed by altering the temporal position of the marker pulses within the deflection screen. If in FIG. 2, for example, the marker pulse M1 is positioned later in time and marker pulse M2 earlier, then a line which lies later in the deflection screen is regulated onto sensor S1 and, correspondingly, at the end of the picture, a correspondingly earlier line is regulated onto sensor S2. The effective deflection amplitude is then enlarged. The correction current for stabilizing the deflection amplitude need not necessarily be fed to the deflection coils themselves. The correction current can, for example, also be fed to the additional deflection coils provided for the convergence correction because these can influence the deflection amplitude in the same way.

We claim:

1. A system for adjusting the position and size of a picture displayed on a picture area larger than said picture, said picture being generated by deflecting a light source in response to a deflection current comprising:

a first and a second differential amplifier, each having an inverting and noninverting input terminal;

means for providing a deflection voltage proportional to said deflection current to the noninverting input terminal of said first differential amplifier and to inverting input terminal of said second differential amplifier;

means for providing a first reference voltage to the inverting input terminal of said first differential amplifier to produce a positive correction pulse in accordance with the difference between said deflection voltage and said first reference voltage;

means for providing a second reference voltage to the noninverting input terminal of said second differential amplifier to produce a negative correction pulse in accordance with the difference between said deflection voltage and said second reference voltage; and correction signal generation means responsive to said correction pulses for providing correction signals to said deflection current.

2. The system of claim 1 wherein said correction signal generation means includes digital-to-analog converter means responsive to said correction pulses for providing positive and negative analog correction voltages representative of said correction pulses.

3. The system of claim 2 wherein said correction signal generation means includes driver means responsive to said digital-to-analog converters and deflection amplifier means responsive to said driver means for correcting the deflection of said light source.

4. A method of controlling the size and position of a picture scanned onto a picture area larger than said picture by using a deflection current to selectively deflect a light beam across said picture area comprising the steps of:

sensing said deflection current and producing a deflection voltage proportional to said deflection current;

comparing said deflection voltage to two reference voltages and producing positive and negative correction pulses;

converting said correction pulses to analog correction voltages and applying said correction voltages to a drive circuit which provides a correction signal; and using said correction signal to control said deflection current to control the scanning of said light across said picture area.

5. The method of claim 4 further including the step of impressing marker pulses upon said deflection current, and using said marker pulses to control the size and location of said picture within said picture area.

6. The method of claim 5 further including the step of arranging sensors within said picture area to sense the deflection of said light and to control the deflection of said light within predetermined deflection limits.

* * * * *